US005579682A

United States Patent [19]
Bergman et al.

[11] Patent Number: 5,579,682
[45] Date of Patent: Dec. 3, 1996

[54] DEVICE FOR HIGH-PRESSURE TREATMENT OF SUBSTANCES

[75] Inventors: Carl Bergman, Västerås; Bertil Malmberg, Helsingborg, both of Sweden

[73] Assignee: Asea Brown Boveri AB, Västerås, Sweden

[21] Appl. No.: 553,368

[22] PCT Filed: Jun. 8, 1994

[86] PCT No.: PCT/SE94/00551

§ 371 Date: Nov. 27, 1995

§ 102(e) Date: Nov. 27, 1995

[87] PCT Pub. No.: WO94/28745

PCT Pub. Date: Dec. 22, 1994

[30] Foreign Application Priority Data

Jun. 11, 1993 [SE] Sweden ................... 9302035

[51] Int. Cl.⁶ ................ A23L 1/00; A23L 3/015; A47J 27/00; B01J 3/02
[52] U.S. Cl. ................ 99/473; 99/467; 99/485; 99/516; 72/60; 72/271; 366/267
[58] Field of Search .............. 99/467–475, 485, 99/483, 646 R, 516, 646 C, 534–536; 366/267–269; 72/60, 271, 272; 220/426, 437

[56] References Cited

U.S. PATENT DOCUMENTS

| | | | |
|---|---|---|---|
| 3,707,864 | 1/1973 | Pigott et al. | 72/60 |
| 3,817,069 | 6/1974 | Hauser et al. | 72/60 |
| 5,083,507 | 1/1992 | Van Haren | 99/467 X |
| 5,213,029 | 5/1993 | Yutaka | 99/474 |
| 5,370,043 | 12/1994 | Traff et al. | 99/485 X |
| 5,381,731 | 1/1995 | Thom, Jr. | 99/516 |
| 5,520,101 | 5/1996 | Perry | 99/467 X |

Primary Examiner—Timothy F. Simone
Attorney, Agent, or Firm—Burns, Doane, Swecker & Mathis, L.L.P.

[57] ABSTRACT

A device for high-pressure treatment, in particular of liquid substances which contain components with a consistency different from that of the liquid. The device comprises a cylinder member (1), two end members (2, 3), a high-pressure piston (4), two high-pressure seals (8, 9) and connection means comprising channels and valve members to conduct the substance to and from the cylinder member (1). When the substance is pressurized, the cylinder member (1), at least one of the end members (3), the high-pressure piston (4) and the two high-pressure seals (8, 9) delimit a high-pressure chamber (10). The connection means are arranged outside the high-pressure chamber and preferably in respective end members (2, 3).

20 Claims, 1 Drawing Sheet

5,579,682

DEVICE FOR HIGH-PRESSURE TREATMENT OF SUBSTANCES

TECHNICAL FIELD

The present invention relates to a device for high-pressure treatment of substances, in particular liquid substances which contain components with a consistency different from that of the liquid, comprising at least one cylinder member, a first and a second end member, a high-pressure piston which is displaceably arranged in the cylinder member and which extends through a first cylinder bore which is provided in the first end member, and at least two high-pressure seals, whereby the cylinder member, the high-pressure piston, the high-pressure seals and at least the second end member are adapted to form a high-pressure chamber when the substance is subjected to pressure, as well as connection means comprising channels and valve members for transporting the substance to and from the cylinder member.

The device is especially suitable for use in high-pressure treatment of, for example, sauces and other liquid substances which contain sensitive components such as pieces of tomatoes, pulp (in fruit) or forcemeat balls (quenelles), which run the risk of being damaged when the substance is transported at high rates of flow through the treatment plant.

BACKGROUND ART

For some time now, high-pressure treatment is being used as a method for, among other things, inactivating microorganisms and certain enzymes in foodstuffs. The advantage of high-pressure treatment as compared with the more frequently used heat-treatment method is that the microorganisms and the degrading enzymes in the foodstuff are killed or inactivated without destroying vitamins and flavouring. During heat treatment, on the other hand, the taste and the vitamin contents are changed, which requires additives to restore, as far as possible, the nutritive value and taste of the substance.

During high-pressure treatment of, for example, foodstuffs, a so-called pressure intensifier is used. By pressure intensifier is meant here a device which has a high-pressure chamber in which the substance to be treated is pressurized. The pressurization can be accomplished, for example, by designing one of the end walls of the high-pressure chamber to accommodate a high-pressure piston with a certain area, which is insertable into the high-pressure chamber. Outside of the high-pressure chamber this piston is secured to a low-pressure piston with a larger area, arranged in a low-pressure chamber. By applying a certain pressure to the low-pressure piston, for example hydraulically, a higher pressure is thus obtained inside the high-pressure chamber. In high-pressure treatment of foodstuffs, it is common for the pressure in the high-pressure chamber to be set at about 1000–15000 bar.

The development of the technique for high-pressure treatment has led to two different, fundamental types of processes. According to one of these types, referred to here as the batch process, the high-pressure treatment is carried out in batches. In this case, the total amount of the substance to be treated is divided into batches, which are normally enclosed in a flexible package. When one batch is to be treated, the pressure intensifier is first opened and the batch is lifted into the cylinder member, whereafter the pressure intensifier is closed, and the high pressure is applied for a certain period of time. When the treatment is completed, the pressure intensifier is opened, the finished batch is removed from the cylinder member and a new batch can be placed therein. This process type is used above all for treatment of solid substances and other substances which cannot be transported in pipelines.

The other process type, here referred to as the semicontinuous process, is used above all for treatment of liquid substances which do not contain sensitive components. The substance to be treated is conducted in the pressure intensifier through a pipeline which is connected to the interior of the cylinder member via an inflow valve. When the inflow valve is opened, the cylinder member is filled with the substance. Then the inflow valve is closed and the high pressure applied. After the treatment, an outflow valve is opened, through which the treated substance is conducted to a pipe-line which is connected to the next stage in the process chain.

JP 1-171553 describes a device for high-pressure treatment according to the semicontinuous process. The device comprises a pressure intensifier with a high-pressure chamber. The high-pressure chamber is defined by a cylinder member and two confronting end members, a displaceable high-pressure piston extending through one of the end members. In the other end member, connection means for transporting the substance to and from the cylinder member are arranged. These connection means consist of an inflow valve and an outflow valve which communicate with an inflow channel and an outflow channel, respectively, extending through the other end member. Further, on the outside of the device the connection means are connected to lines which communicate with a storage tank and a product tank, respectively.

The substance which is treated is pumped from the storage tank via the inflow channel and the inflow valve into the cylinder member, whereby the outflow valve is closed. Thereafter, the inflow valve is closed and the substance in the high-pressure chamber is pressurized by displacing the high-pressure piston inwards in the chamber. After the pressure treatment, the pressure is reduced by displacing the high-pressure piston outwards in the high-pressure chamber. Thereafter, the outflow valve is opened and the high-pressure piston is again moved inwards in the cylinder member, the substance being pressed out of the high-pressure chamber through the outflow valve and the outflow channel and being forwarded via a pipe-line to the product tank.

Problems

High-pressure treatment according to the prior art described above involves problems. These problems are that, if the prior art is used for treating substances which contain components with a consistency different from that of the liquid, these components run the risk of being damaged. Such components, for example pieces of tomatoes, quenelles or pulp, are easily disintegrated by the shearing forces which arise in case of great flow rates. The disintegration is, of course, highly unwanted since it affects the natural consistency of the treated substance.

The flow rate in a valve or a line section depends on the flow and the flow area, such that the flow rate increases with a reduced flow area at a certain flow. Since the high-pressure treatment is normally included as one step in a manufacturing process, it is of the utmost importance that the total time of the high-pressure treatment is kept as short as possible. The time during which the substance is maintained under pressure cannot be reduced without deteriorating the treatment result. Therefore, the aim is instead to reduce the time for filling and emptying the cylinder member. This aim is achieved by increasing the flow when filling and emptying the cylinder member. During high-pressure treatment according to JP 1-171553 of substances containing sensitive components, however, large flows result in the sensitive components being damaged because of the high flow rates which arise in valves and lines which have a small flow area. Thus, to avoid damaging the treated substance, during high-pressure treatment according to this publication, the flow rates and hence the production rate must be kept low.

The problem with the prior art, described, inter alia, in JP 1-171553, thus resides in the fact that the valve members and channels of the connection means for transport of the substance cannot be designed with sufficiently large flow areas. The reasons for this are that the two valves and the connecting channels are designed in one and the same end member, and also that the valve members are adapted so as to open out inside the high-pressure chamber. Since both valves are located in one and the same end member, their total flow area is limited by the cross-section area of the cylinder member. For reasons of strength, the valve openings must be circular. This means that the theoretical geometrical limit to the maximum size of the flow area of a valve orifice, in relation to the cross-section area of the cylinder member, consists of the area of one of two equally large circles which are inscribed in a larger circle. Thus, theoretically, the flow area of a valve may, at a maximum, constitute one-fourth of the cross-section area of the cylinder member. In practice, however, the maximum permissible area is considerably smaller, which will be described below.

A proposal for a solution to the above problem is given according to the current technique by using only one valve both as inflow to and outflow from the cylinder member. For reasons of strength, however, this solution is not practicable at the high pressures used during high-pressure treatment of foodstuffs. In addition, the known solution entails other problems which render it unuseful for high-pressure treatment of foodstuffs. The substance which is treated is passed both into and out of the cylinder member via the same valve member and connection channel. Therefore, such untreated residues of the substance which adhere to these members on their way into the cylinder member will mix with the treated substance when the latter is on its way out. This means that bacteria and other microorganisms from the untreated substance can easily spread and, by propagation, pass on infection to the recently high-pressure treated substance. Such a solution, of course, is unacceptable when it comes to high-pressure treatment of foodstuffs.

However, a more serious limitation of the maximum flow area of the valve members is the fact that the valve members open out inside the high-pressure chamber. Because a pressure of up to 15000 bar prevails in the high-pressure chamber during the high-pressure treatment, it is in practice impossible, for reasons of strength, to design valve orifices and valve bodies which exhibit a larger pressure-exposed area than a few per cent of the cross-section area of the cylinder member.

In addition, according to the prior art described above, the connection channels which are arranged in the end member are, and must be, at least partially provided axially immediately outside that area of the end member which is pressure-exposed from the high-pressure chamber. In addition, these connection channels extend into the material zones in the end member in which the force flows from the high-pressure chamber are concentrated. The material around the channels is therefore subjected to considerable stresses and the larger the flow areas of the channels are made, the greater is the risk of cracks in the material in the end member. Admittedly, such designs are, according to the state of the art, the most suitable designs for transporting the substance to and from the high-pressure chamber. Still, they have obvious deficiencies. During high-pressure treatment of foodstuffs, pressures of up to 15,000 bar are utilized. These pressures approach the yield point of the very good structural steels which are used in the designs of the pressure intensifiers. It is thus necessary for the force-absorbing parts of the designs to be made very simple and without holes or cavities, which constitute notch factors. Such notch factors can multiply the stresses in the material in the vicinity of the cavities. This entails a considerable risk of material fractures, in particular when the stresses are cyclic and the cycle numbers are high, which is the case during high-pressure treatment of foodstuffs where a high treatment capacity is necessary.

Thus, according to the prior art described in the above document, it is, in practice, not possible to subject liquid substances, which contain sensitive components, to high-pressure treatment. In any case, it is not possible with an economically justifiable rate of treatment and without changing the natural consistency of the substance.

An alternative for high-pressure treatment of substances containing sensitive components would be to treat them according to the batch principle described above. In that case, transport of the substance through narrow conduits and valve members could be avoided. Owing to the slow and complicated handling of the batches, however, this alternative results in too low a rate of treatment, which leads to this mode of treatment being uneconomical when treating large quantities of the substance.

The object of the present invention is, therefore, to provide a device for high-pressure treatment of liquid substances, which allows large flows without the flow rates becoming too large or without the risk of an untreated substance being mixed with a treated substance.

The solution

The above object is achieved according to the present invention with a device of the kind described in the introductory part of the description and which is characterized in that the connection means are arranged outside the high-pressure chamber.

Since the connection means are located entirely outside the high-pressure chamber which is sealed by means of the high-pressure seals, no part of the connection means is subjected to the high pressures which prevail in the high-pressure chamber during pressurization of the substance. This, in turn, means that the valve members and channels which constitute the connection means can be dimensioned independently of the high pressures which prevail in the high-pressure chamber. Thus, the flow areas of these connection means can be chosen such that the substance can be transported with large flows, without the flow rate becoming so high that sensitive components in the substance run the risk of being damaged owing to shearing.

According to a preferred embodiment of the invention, the connection means for conducting the substance to and from the device are arranged, respectively, in the first and the second end member.

Since the substance is conducted to and from the high-pressure chamber, respectively, through an inlet and an outlet which are arranged in respective end members, it is possible to utilize large flow areas for all the flow channels which are passed by the substance on its way through the pressure intensifier. In actual fact, the device makes it possible for the cross section of the cylinder member alone to constitute an upper limit to the size of the smallest flow area. At the same time, the treated substance never has to be conducted through channels which may contain residues of non-treated substance. In this way, the risk of, for example, microorganisms from a non-treated substance coming into contact with, and infecting, a recently treated substance is thus eliminated.

In two further embodiments of the device according to the invention, the first one is characterized in that the connection means in the first end member comprise the first cylinder bore and at least one first connection channel which extends from this first cylinder bore to the outside of the device, and that the high-pressure piston is adapted to be displaced, as a valve member, past the orifice of the first connection channel in the cylinder bore. Further, the second embodiment is characterized in that the second end member comprises a plunger which is axially displaceable in a second axial cylinder bore which is provided in this second end member, that the connection means in the end member just mentioned comprise a second connection channel which extends from the second cylinder bore to the outside of the device, and that the plunger is adapted to be displaced, as a valve member, past the orifice of the second connection channel in the second cylinder bore.

The two embodiments described in the preceding paragraph allow the substance to be rapidly passed into or out of the cylinder member through the first and second end member, respectively, while at the same time the channels for transporting the substance are completely relieved of pressure also when the extremely high treatment pressure prevails inside the high-pressure chamber.

According to still another embodiment of the invention, low-pressure seals are arranged in the first and second cylinder bores, these low-pressure seals cooperating with the high-pressure piston and with the plunger, respectively, outside the orifices of the first and second connection channels, respectively, in the respective cylinder bore.

The low-pressure seals according to the above embodiment prevent the substance from leaking out of the device during filling and emptying of the cylinder member, and at the same time these seals prevent impurities from outside from penetrating into the device and mixing with the substance.

Further, another embodiment is characterized in that a spacing block is movably arranged between the plunger in the second end member and a frame, which is intended to take up axial forces during pressurization of the substance. In the inserted position, the spacing block is adapted to prevent the plunger from moving outwards and, in the retracted position, to allow the plunger to be displaced outwards.

The above embodiment offers a simple way of taking up great axial forces which act on the plunger, without the use of large hydraulic cylinders, which would otherwise be necessary. At the same time, simple and rapid opening and closing of the plunger are ensured, for example for filling or emptying the cylinder member.

Yet another embodiment of the invention is characterized in that the first and second connection channels each open out into an annular slot which is provided in the respective cylinder bore. This embodiment allows the cross-section area of the orifices of the connection channels in the cylinder bores to be increased and the substance to be moved more rapidly into and out of the cylinder member.

Further, two embodiments of the invention are intended to offer a fast and simple emptying of the cylinder member. According to one of these embodiments, the longitudinal axis of the cylinder member is inclined in relation to the horizontal plane, such that the end member which comprises the connection means which are intended to conduct the substance from the cylinder member is located at a lower level than the opposite end member. In this way, the substance is able to run out of the cylinder member by force of gravity during emptying. The second one of these embodiments is characterized in that the device is provided with means to introduce gas under pressure in the cylinder element. These means allow the time for emptying the cylinder member to be further reduced.

BRIEF DESCRIPTION OF THE DRAWING

An exemplifying embodiment of the invention will be described below with reference to the accompanying drawing, wherein.

Figure 1:
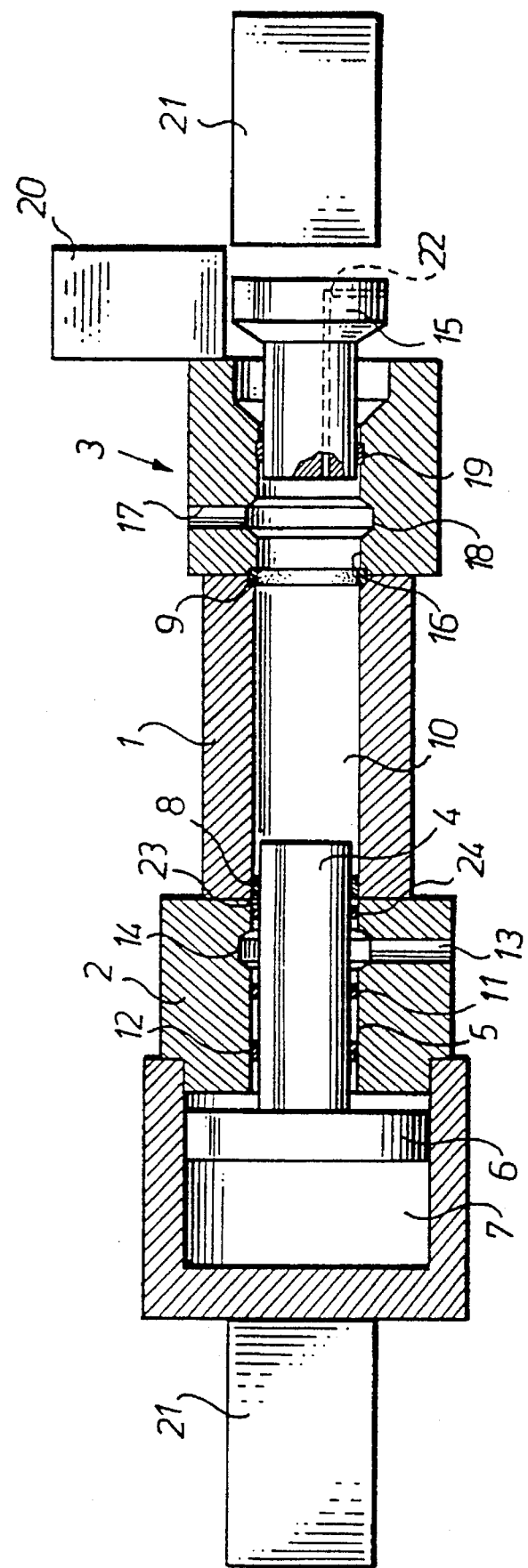
FIG. 1 is a longitudinal section through the device according to one embodiment of the invention, The device for high-pressure treatment of liquid substances shown in FIG. 1 comprises a cylinder member 1, a first end member 2 and a second end member 3 which is opposite to the first end member 2. A high-pressure piston 4 is displaceably arranged in the cylinder member 1 and extends through an axial cylinder bore 5, which is provided in the first end member 2. The high-pressure piston 4 is secured to a low-pressure piston 6 which has a larger area and which is displaceably arranged in a low-pressure chamber 7 for containing a pressure medium. A first high-pressure seal 8 is arranged around the envelope surface of the high-pressure piston 4, at the cylinder member 1 and the first end member 2. In addition, a second high-pressure seal 9 is arranged between the cylinder member 1 and the plunger 15 in the second end member 3. The cylinder member 1, the high-pressure piston 4, the second end member 3 with the plunger 15 and the first and second high-pressure seals 8, 9 thus delimit a high-pressure chamber 10 when the substance is pressurized.

Further, a first low-pressure seal 11 and a barrier seal 12 are arranged around the high-pressure piston 4 outside the first high-pressure seal 8, as viewed from the cylinder member 1. The common piston stroke of the high-pressure piston 4 and the low-pressure piston 6 as well as the distance between the barrier seal 12 and the first low-pressure seal 11 are adapted such that the high-pressure piston 4, on its envelope surface, cannot bring with it pressure medium from the low-pressure chamber 7 past the first low-pressure seal 11 when the high-pressure piston 4 has been displaced from its left-hand to its righthand end position in the figure. In a corresponding way, when the high-pressure piston 4 has been displaced from its righthand to its lefthand end position, it cannot bring along the substance which is treated from the high-pressure chamber 10 past the barrier seal 12. What is described above is within the scope of the prior art.

In the first end member 2, a first connection channel 13 is provided. This first connection channel 13 extends from the outside of the device and opens out into an annular slot 14 which is provided in the first cylinder bore 5, between the first high-pressure seal 8 and the first low-pressure seal 11.

The second end member 3 comprises a plunger 15 which is displaceably arranged in a second axial cylinder bore 16 which is provided in the second end member 3. In the second end member 3, also a second connection channel 17 is provided. This second connection channel 17 extends from the outside of the device and opens out into a second annular slot 18 which is provided in the second cylinder bore 16. A second low-pressure seal 19 is arranged outside the second annular slot 18, as viewed from the high-pressure chamber 10. The orifices of the two connection channels 13, 17 and the two annular slots 14, 18 are thus arranged between the high-pressure and low-pressure seals 8, 9, 11, 19 in their respective end members 2, 3.

A spacing block 20 is displaceably arranged between the plunger and a press frame 21 which axially surrounds the device. This press frame is intended to take up the axial forces which arise when the high pressure is generated and it can, for example, comprise a prestressed wire winding in a known manner. When the spacing block 20 is in its inserted position, it prevents the plunger 15 from moving outwards. The spacing block 20 is intended to be in the inserted position when the high pressure prevails in the high-pressure chamber 10. The axial forces acting on the plunger 15 are then transmitted via the spacing block 20 to the surrounding press frame 21. When the spacing block 20 is in the retracted position, it allows the plunger 15 to be moved outwardly, away from the cylinder member 1.

Further, the device is provided with means 22 to introduce gas into the cylinder member 1 when a high pressure does not prevail therein. In the embodiment shown, these means 22 consist of a narrow channel which extends through the plunger 15 and which, via a high-pressure valve (not shown), communicates with the high-pressure chamber 10.

The device also comprises a steam barrier 23 which is arranged outside the first high-pressure seal 8. The steam barrier 23 consists of a gap which is formed between the first high-pressure seal 8 and a steam barrier seal 24, which is arranged in the first cylinder bore 5 outside the high-pressure seal 8. A narrow channel (not shown) for transporting high-temperature steam leads to the steam barrier. If fragments of the substance being treated leak out from the high-pressure chamber during the pressurization, these fragments can be disinfected by passing hot steam into the steam barrier. This eliminates the risk of microorganisms from the substance fragments contaminating a treated substance when, after the high-pressure phase, the substance is passed out past the high-pressure seal.

In the following, a description will be made of how high-pressure treatment of liquid substances is carried out in the embodiment of the device according to the invention, shown in FIG. 1.

At the start of the process, the high-pressure piston 4 is inserted a certain distance into the cylinder member 1, past the first high-pressure seal 8. The connection between the cylinder member 1 and the first connection channel 13 is thus blocked. The spacing block 20 is in its retracted position and the plunger 15 is also retracted past the second high-pressure seal 9 and the second annular slot 18. However, the plunger 15 is not retracted so far that the sealing effect of the low-pressure seal 19 against the envelope surface of the plunger ceases.

The substance to be subjected to high-pressure treatment is conducted to the orifice of the second connection channel 17 on the outside of the device. Then it is conducted via this second connection channel 17, the second annular slot 18 and the second cylinder bore 16 into the cylinder member 1. When the cylinder member 1 contains the intended quantity of the substance, the plunger 15 is displaced inwardly past the second annular slot 18 with the orifice of the second connection channel 17 and past the second high-pressure seal 9. In this way, the connection between the second connection channel 17 and the cylinder member 1 is blocked. At the same time, the substance is enclosed in the high-pressure chamber 10 which is sealed from the surroundings with the first and second high-pressure seals 8, 9. To lock the plunger 15 in its position, the spacing block 20 is now brought to its inserted position between the plunger 15 and the press frame 21.

After that, pressure medium is supplied to the low-pressure chamber 7, whereby the high-pressure piston 4, while building up a high pressure in the high-pressure chamber 10, is displaced another distance into the cylinder member 1. When the required pressure has been attained, this pressure can possibly be maintained for a certain holding time by keeping the high-pressure piston 4 still in its inserted position. When the high-pressure phase is completed, the high-pressure piston 4 is again displaced outwardly, the substance in the high-pressure chamber 10 thus being decompressed to the normal pressure. The high-pressure piston 4 is displaced further outwardly past the first high-pressure seal 8 and the first annular slot 14 with the orifice of the first connection channel 13. However, the high-pressure piston 4 is not displaced past the first low-pressure seal 11. The connection between the cylinder member 1 and the first connection channel 13 is thus opened, allowing the substance to run out of the cylinder member 1 via the first cylinder bore 5, the first annular slot 14 and the first connection channel 13. This first connection channel 13 is further connected to a conduit (not shown) which passes the substance on to the next stage in the process. To accelerate the emptying of the cylinder member 1, a gas is introduced under pressure via the narrow channel 22 and the high-pressure valve (not shown) in the plunger 15.

When the cylinder member 1 is emptied, the high-pressure piston 4 is again moved a certain distance into the cylinder member 1 past the first high-pressure seal 8. Further, the spacing block 20 is brought to its retracted position, whereupon the plunger 15 is moved outwardly past the second high-pressure seal 9 and the second annular slot 18. Thereafter, a new quantity of the substance can be supplied to the device.

During the whole treatment process, from the initial introduction of the substance into the high-pressure chamber 10 until the substance is decompressed, hot steam is supplied to the steam barrier 23. The reason for this is to maintain sterility in the outflow sections of the device during the whole process.

It is to be noted that the high-pressure piston 4 and the plunger 15 will function as valve members. In this connection, parts of the envelope surface of these elements constitute valve members which cooperate with the orifices of the first and second connection channels 13, 17, respectively, in the respective cylinder bores 5, 16. Contrary to the small valves used according to the prior art, which are of seat valve type, according to the invention parts of the envelope surface of the high-pressure piston 4 and the plunger 22 serve as a slide which cooperates with the orifices of the respective connection channels 13, 17. According to the invention, the connection means can be said to comprise valve members of slide valve type. It is to be noted, however, that these valve members as well as the connection channels to which they are connected are arranged at a distance from the high-pressure chamber which is safe from the point of view of strength. This means that even during the high-pressure treatment, the connection means are situated in material regions which are subjected to relatively moderate compressive stresses. It is thus possible to design the connection channels with large flow areas, without risking material ruptures, even at very high pressures and large cycle numbers.

The invention is not, of course, limited to the embodiment described above, but can be modified in a number of ways within the scope of the appended claims.

For example, the substance can instead be supplied to the cylinder member 1 via the connection means in the first end member and be brought therefrom via the connection means in the second end member.

Further, one of or both of the end members may be provided with more than one connection channel which open out into the respective cylinder bores. In that case, one or more of these connection channels may constitute means to introduce the gas which is conducted into the cylinder member during emptying. The narrow channel in the plunger can thus be eliminated.

It is also possible to completely eliminate the means for supply of gas. The emptying of the cylinder member can then instead be made possible by arranging the longitudinal axis of the cylinder member to incline in relation to the horizontal plane. During the emptying, the substance can then run out, by force of gravity, through the connection means which are provided at the lowest level.

We claim:

1. A device for high-pressure treatment of substances, in particular liquid substances which contain components with a consistency different from that of the liquid, comprising at least one cylinder member (1), a first and a second end member (2,3), a high-pressure piston (4) which is displaceably arranged in the cylinder member and which extends through a first cylinder bore (5) which is provided in the first end member, and at least two high-pressure seals (8,9), wherein the cylinder member, the high-pressure piston, the high-pressure seals and at least the second end member are adapted to delimit a high-pressure chamber (10) when the substance is pressurized, as well as connection means comprising channels and valve members for conveying the substance to and from the cylinder member, characterized in that the connection means also include at least one sealing means (11, 19), other than the high pressure seals (8, 9) and that these connection means are arranged outside the high-pressure chamber.

2. A device according to claim 1, characterized in that the connection means for conducting the substance to the device are arranged in one of the first or second end member (2,3) and the connection means for conducting the substance from the device are arranged in the other of the first or second end member (2,3).

3. A device according to claim 1, characterized in that the connection means in the first end member (2) comprise the first cylinder bore (5), a first low-pressure seal (11) and at least one first connection channel (13) which extends from said first cylinder bore to the outside of the device and that the high-pressure piston (4) is adapted, as a valve member, to be displaced past the orifice of said first connection channel (13) in the first cylinder bore.

4. A device according to claim 1, characterized in that the second end member (3) comprises a plunger (15) which is axially displaceable in a second axial cylinder bore (16) which is provided in said second end member, that the connection means in said second end member comprise a second low-pressure seal (19) and a second connection channel (17) which extends from said second cylinder bore (16) to the outside of the device, and that said plunger (15) is adapted, as a valve member, to be displaced past the orifice of said second connection channel (17) in said second cylinder bore (16).

5. A device according to claim 1, characterized in that the low-pressure seals (11,19) are arranged in said first and second cylinder bores (5,16) and that said low-pressure seals cooperate with the high-pressure piston (4) and with the plunger (15), respectively, outside the orifices of the first (13) and second (17) connection channels, respectively, in the respective cylinder bores (5,16).

6. A device according to claim 1, characterized in a spacing block (20) is movably arranged between the second end member (3) and a frame (21) which is intended to take up axial forces during the pressurization of the substance, whereby, in the inserted position, said spacing block (20) is adapted to prevent the plunger (15) from moving outwardly and, in the retracted position, said spacing block is adapted to allow the plunger to be displaced outwardly.

7. A device according to claim 1, characterized in that the first (13) and second (17) connection channels open out into respective annular slots (14,18) which are provided in the respective cylinder bores (5,16).

8. A device according to claim 1, characterized in that the longitudinal axis of the cylinder member (1) is inclined in relation to the horizontal plane, such that the end member which comprises the connection means which are intended to conduct the substance away from the cylinder member (1) is located at a lower level than the opposite end member.

9. A device according to claim 1, characterized by means (22) to introduce gas under pressure into the cylinder member (1).

10. A device according to claim 1, characterized in that at least one steam barrier (23) is arranged between the first high-pressure seal (8) and a steam barrier seal (24) arranged outside of said high-pressure seal.

11. A device according to claim 2, characterized in that the connection means in the first end member (2) comprise the first cylinder bore (5), a first low-pressure seal (11) and at least one first connection channel (13) which extends from said first cylinder bore to the outside of the device and that the high-pressure piston (4) is adapted, as a valve member, to be displaced past the orifice of said first connection channel (13) in the first cylinder bore.

12. A device according to claim 2, characterized in that the second end member (3) comprises a plunger (15) which is axially displaceable in a second axial cylinder bore (16) which is provided in said second end member, that the connection means in said second end member comprise a second low-pressure seal (19) and a second connection channel (17) which extends from said second cylinder bore (16) to the outside of the device, and that said plunger (15) is adapted, as a valve member, to be displaced past the orifice of said second connection channel (17) in said second cylinder bore (16).

13. A device according to claim 3, characterized in that the second end member (3) comprises a plunger (15) which is axially displaceable in a second axial cylinder bore (16) which is provided in said second end member, that the connection means in said second end member comprise a second low-pressure seal (19) and a second connection channel (17) which extends from said second cylinder bore (16) to the outside of the device, and that said plunger (15) is adapted, as a valve member, to be displaced past the orifice of said second connection channel (17) in said second cylinder bore (16).

14. A device according to claim 2, characterized in that the low-pressure seals (11, 19) are arranged in said first and second cylinder bores (5, 16) and that said low-pressure seals cooperate with the high-pressure piston (4) and with the plunger (15), respectively, outside the orifices of the first (13) and second (17) connection channels, respectively, in the respective cylinder bores (5, 16).

15. A device according to claim 3, characterized in that the low-pressure seals (11, 19) are arranged in said first and second cylinder bores (5, 16) and that said low-pressure seals cooperate with the high-pressure piston (4) and with the plunger (15), respectively, outside the orifices of the first (13) and second (17) connection channels, respectively, in the respective cylinder bores (5, 16).

16. A device according to claim 4, characterized in that the low-pressure seals (11, 19) are arranged in said first and second cylinder bores (5, 16) and that said low-pressure seals cooperate with the high-pressure piston (4) and with the plunger (15), respectively, outside the orifices of the first (13) and second (17) connection channels, respectively, in the respective cylinder bores (5, 16).

17. A device according to claim 2, characterized in a spacing block (20) is movably arranged between the second end member (3) and a frame (21) which is intended to take up axial forces during the pressurization of the substance, whereby, in the inserted position, said spacing block (20) is adapted to prevent the plunger (15) from moving outwardly and, in the retracted position, said spacing block is adapted to allow the plunger to be displaced outwardly.

18. A device according to claim 2, characterized in that the first (13) and second (17) connection channels open out into respective annular slots (14, 18) which are provided in the respective cylinder bores (5, 16).

19. A device according to claim 2, characterized in that the longitudinal axis of the cylinder member (1) is inclined in relation to the horizontal plane, such that the end member which comprises the connection means which are intended to conduct the substance away from the cylinder member (1) is located at a lower level than the opposite end member.

20. A device according to claim 2, characterized by means (22) to introduce gas under pressure into the cylinder member (1).

* * * * *